(12) United States Patent
Kochhar et al.

(10) Patent No.: US 10,807,603 B2
(45) Date of Patent: Oct. 20, 2020

(54) METHOD AND APPARATUS FOR PREDICTIVE DRIVER ASSISTANCE

(71) Applicant: FORD GLOBAL TECHNOLOGIES, LLC, Dearborn, MI (US)

(72) Inventors: Devinder Singh Kochhar, Ann Arbor, MI (US); Michael James Whitens, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 826 days.

(21) Appl. No.: 15/090,688

(22) Filed: Apr. 5, 2016

(65) Prior Publication Data
US 2017/0282930 A1   Oct. 5, 2017

(51) Int. Cl.
*B60W 40/09* (2012.01)
*B60W 50/00* (2006.01)
*B60W 50/10* (2012.01)

(52) U.S. Cl.
CPC ........ *B60W 40/09* (2013.01); *B60W 50/0097* (2013.01); *B60W 50/10* (2013.01); *B60W 2050/0089* (2013.01); *B60W 2540/043* (2020.02); *B60W 2540/22* (2013.01); *B60W 2540/30* (2013.01)

(58) Field of Classification Search
CPC .. B60W 40/09; B60W 50/0097; B60W 50/10; B60W 2050/0089; B60W 2540/30; B60W 2540/043; G06N 5/02
USPC ................... 701/36; 340/438, 461
See application file for complete search history.

(56) References Cited

U.S. PATENT DOCUMENTS

| | | | |
|---|---|---|---|
| 9,159,023 B2 | 10/2015 | Bone et al. | |
| 2014/0052681 A1* | 2/2014 | Nitz | H04L 51/02 706/46 |
| 2015/0178620 A1 | 6/2015 | Ascari et al. | |
| 2015/0266486 A1 | 9/2015 | Silvlin | |
| 2016/0080500 A1* | 3/2016 | Penilla | H04W 4/003 709/226 |

* cited by examiner

*Primary Examiner* — Isaac G Smith
(74) *Attorney, Agent, or Firm* — Michael Spenner; Brooks Kushman P.C.

(57) ABSTRACT

A system includes a processor configured to predict upcoming driver behavior based on a correlation between received context variables and previously observed driver behavior. The processor is also configured to request confirmation that predicted behavior is intended by a driver. Further, the processor is configured to change an in-vehicle display to include a control or feature relevant to the predicted behavior, upon confirmation receipt.

20 Claims, 4 Drawing Sheets

METHOD AND APPARATUS FOR PREDICTIVE DRIVER ASSISTANCE

TECHNICAL FIELD

The illustrative embodiments generally relate to a method and apparatus for predictive driver assistance.

BACKGROUND

There is an explosive growth in available technologies to make the driving task safer, fun and enjoyable for the driver. Some examples include technologies that enable assisted or automatic control of lateral and longitudinal position of the vehicle, automatic settings for entertainment, climate control, traction control, vehicle navigation, and autonomous cruise functionality. Also included are auditory, visual, and haptic warnings that either caution, and/or alert the driver to untoward actions or situations so that the driver can avoid a likely or imminent collision situation.

Due to the wealth of possibilities and the variance in possible driving situations, a current practice among automotive original equipment manufacturers is to make all controls and displays available to the driver. These controls and/or displays may be positioned in the instrument panel, the center stack, the steering wheel, in the console, or even in the roof liner. Some controls and their associated displays may be made available in the form of embedded menus in a CRT type display. Given the vast potential for possible display combinations of useful tools and information, there is rarely enough room or space in the vehicle interior to position every control and display that could be useful. Also, menu-type displays frequently represent a source of great dissatisfaction for older drivers because of perceived complexity, and displays and controls that are not frequently used are problematic to invoke or engage in those moments when they are actually required, because the driver may be unfamiliar with how to navigate to the needed display or where to find the needed control.

SUMMARY

In a first illustrative embodiment, a system includes a processor configured to predict driver behavior based on a correlation between received context variable values and previously observed driver behavior. The processor is also configured to request confirmation that predicted behavior is intended by a driver. Further, the processor is configured to change an in-vehicle display to include a control or feature relevant to the predicted behavior, upon confirmation receipt.

In a second illustrative embodiment, a computer-implemented method includes receiving a plurality of context variables and corresponding variable values. The method also includes predicting upcoming driver behavior based on the received context variable values compared to context variable values received and stored with respect to observed driver behavior and automatically changing a vehicle display to display a control or feature relevant to the predicted behavior.

In a third illustrative embodiment, a non-transitory computer readable storage medium stores instructions that, when executed, cause a processor to execute a method including receiving a plurality of context variables and corresponding variable values. The method also includes predicting upcoming driver behavior based on the received context variable values compared to context variable values received and stored with respect to observed driver behavior and automatically changing a vehicle display to display a control or feature relevant to the predicted behavior.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
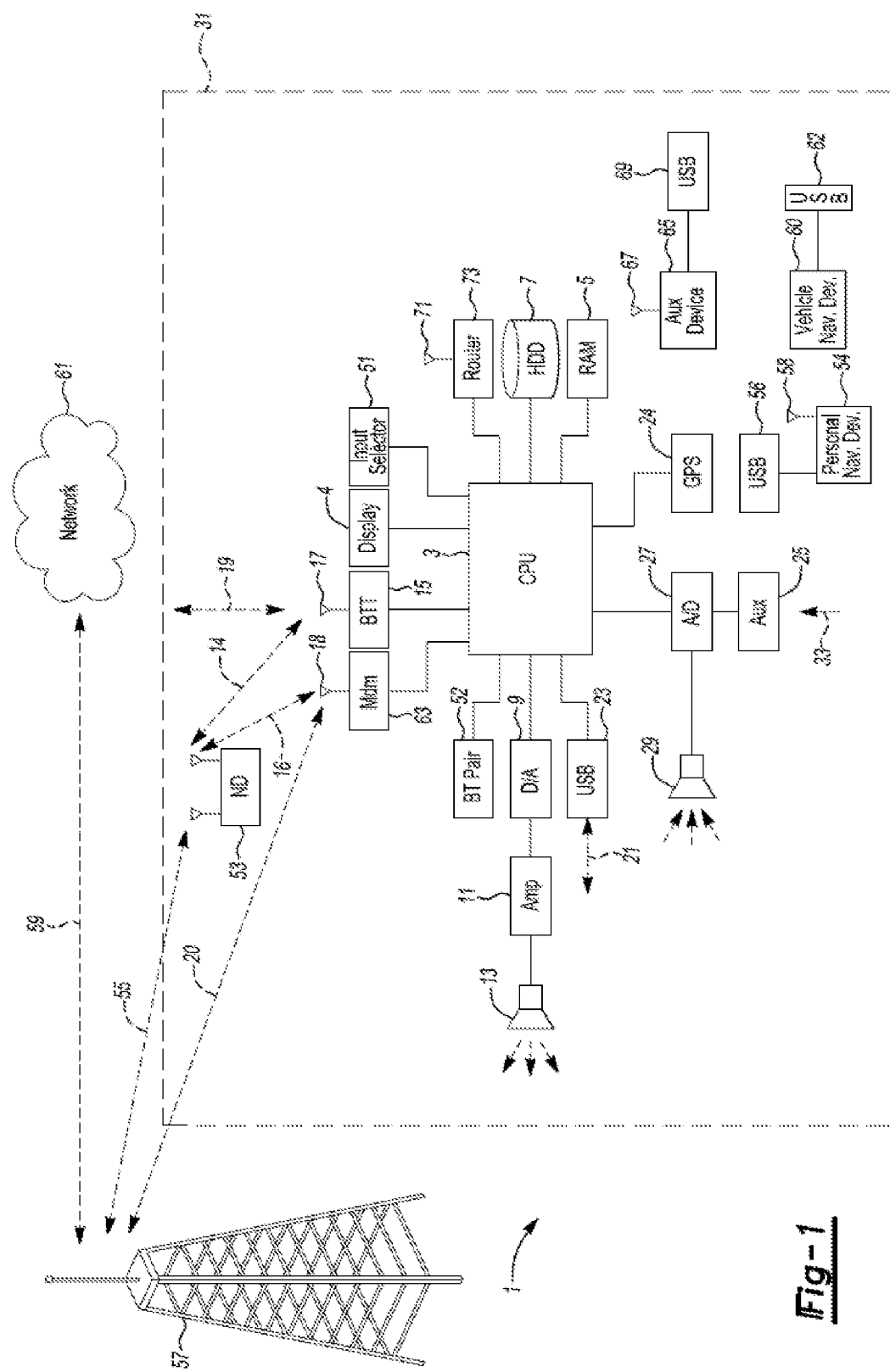
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

As previously noted, in any given situation, a driver may need/want a varied set of controls or inputs based on current conditions. For example, upon initially setting out in a vehicle, the driver may wish to set a radio station or climate. On days when the climate is reasonable (e.g., the interior temperature is within an observed, preferred range), the driver may first change the radio before performing any climate settings. On other days, where the interior temperature is above or below a preferred range, the driver may first set the climate before changing the radio. Even in this fairly simple example, where the vehicle is not yet moving, the driver may have to navigate through one or more menus to obtain a desired control. Since different actions are taken under different conditions when the driver enters the vehicle, there cannot be a simple default to "always display climate" or "always display radio." Or rather, one of these could be a default, but at least some of the time defaulting to a particular option would not result in a display appropriate for the immediate desires of the driver.

Providing a driver with a "smart" vehicle display can reduce driver frustration, save the driver time, and increase the driver's feeling that the vehicle is in touch with modern technology. Further, in a driving situation, a driver may simply forego use of certain vehicle features that would improve the driving experience, because the driver does not know about the features, or because the driver is too busy driving to navigate to a particular feature.

The illustrative examples present solutions based on a determination of driver intent. Driver intent can be instantaneously determined through an algorithm that uses neural networks, for example. Illustrative inputs to such an algorithm include: (i) driver physiological measures that include, but are not restricted to, heart rate, respiration rate, evoked cortical potentials, galvanic skin response, and electromyography; (ii) driver behavior parameters as determined from OBD data and include, but are not restricted to, brake pedal activation, accelerator activation, steering wheel activation; (iii) observable inputs in reference to the driver, such as, but not limited to, visual search and scan activity, frequency and duration of gaze and view of the side and rear-view mirrors, instrument panel and dashboard; and (iv) camera view of the path of travel and of the sides of the driven vehicle. An exemplary algorithm uses Markov analyses of all of the mentioned variables to determine, as output, the immediate intent of the driver (e.g., change lane of travel, accelerate vehicle, slow down, use a telematics system to contact someone, etc.).

These and other context variables can be measured by in-vehicle sensors or driver devices/sensors worn/carried and in contact or connection with a vehicle. Other context variables can be provided to a vehicle through a wireless connection with a remote network.

Based on the determined intent, a virtual control and display panel that relates to the determined intent can be made available to the driver or other occupants. This can be automatically presented as an activatable option, or the display can simply be dynamically adjusted. The automatic presentation of certain displays and controls can be contingent on, for example, preferred driver settings and/or a degree of confidence associated with a particular prediction.

Study has shown, for example, that driver intent to make a lane change can be foreseen from an analysis of heart rate data. Similarly, in at least one illustrative example, driver intent to invoke any feature/function can be determined and momentarily assigned to a re-configurable steering wheel with an embedded circumferential ring. When an 'intent' is sensed by the neural network based algorithm (i.e., when conditions dictate that a likely driver action is upcoming), and the driver interacts with (such as taps) the circumferential ring on the steering-wheel, a related display is provided as confirmatory feedback and the intended action is completed through the appropriate vehicle system. As noted, based on settings and a confidence level, the display can simply be automatically changed, without waiting for approval. (For example, the driver could have preconfigured automatic display change when traffic volume is high, or when a confidence is above N percent, or for certain features, etc.).

Figure 2:
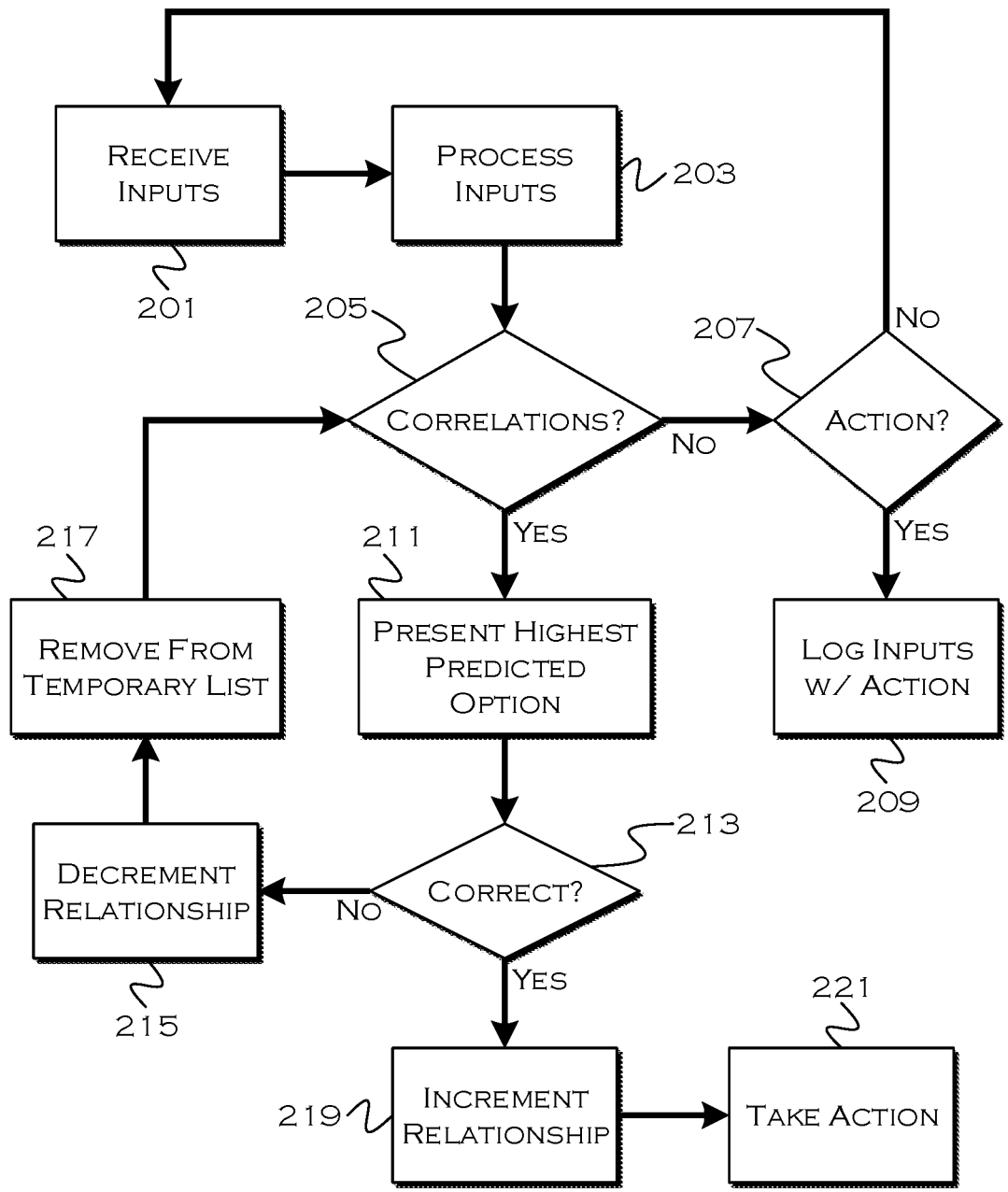
FIG. 2 shows an illustrative example of a predictive process for providing predictive driver assistance.

FIG. 2 shows an illustrative example of a predictive process for providing predictive driver assistance. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process will predict an intent associated with a variety of context variables. A number of non-limiting context variables were previously listed, described generally as driver physiological measures, driver behavior parameters, observable inputs, and camera view. Other non-limiting context variables include, but are not limited to, weather, traffic, time of day, day of week, etc. Combinations of a variety of context factors can be observed in conjunction with specific driver actions, and if the same variables occur frequently enough during the same actions, there is a likely observable correlation between at least some of the context and the driver action. Thus, upon occurrence of the relevant variables existing at certain states, the driver action can be predicted with at least some degree of success.

In this illustrative example, one or more context inputs are received by a prediction processing system 201, such as the aforementioned algorithm using neural networks. Neural networks are useful in situations such as these, where rule based algorithms may be more difficult to apply, due to variances in input and the large possible number of input variables available. Different variables can be given different weight over time, with respect to predicting a certain behavior, as the system "learns" which variables carry a higher correlation to which behaviors.

Figure 3:
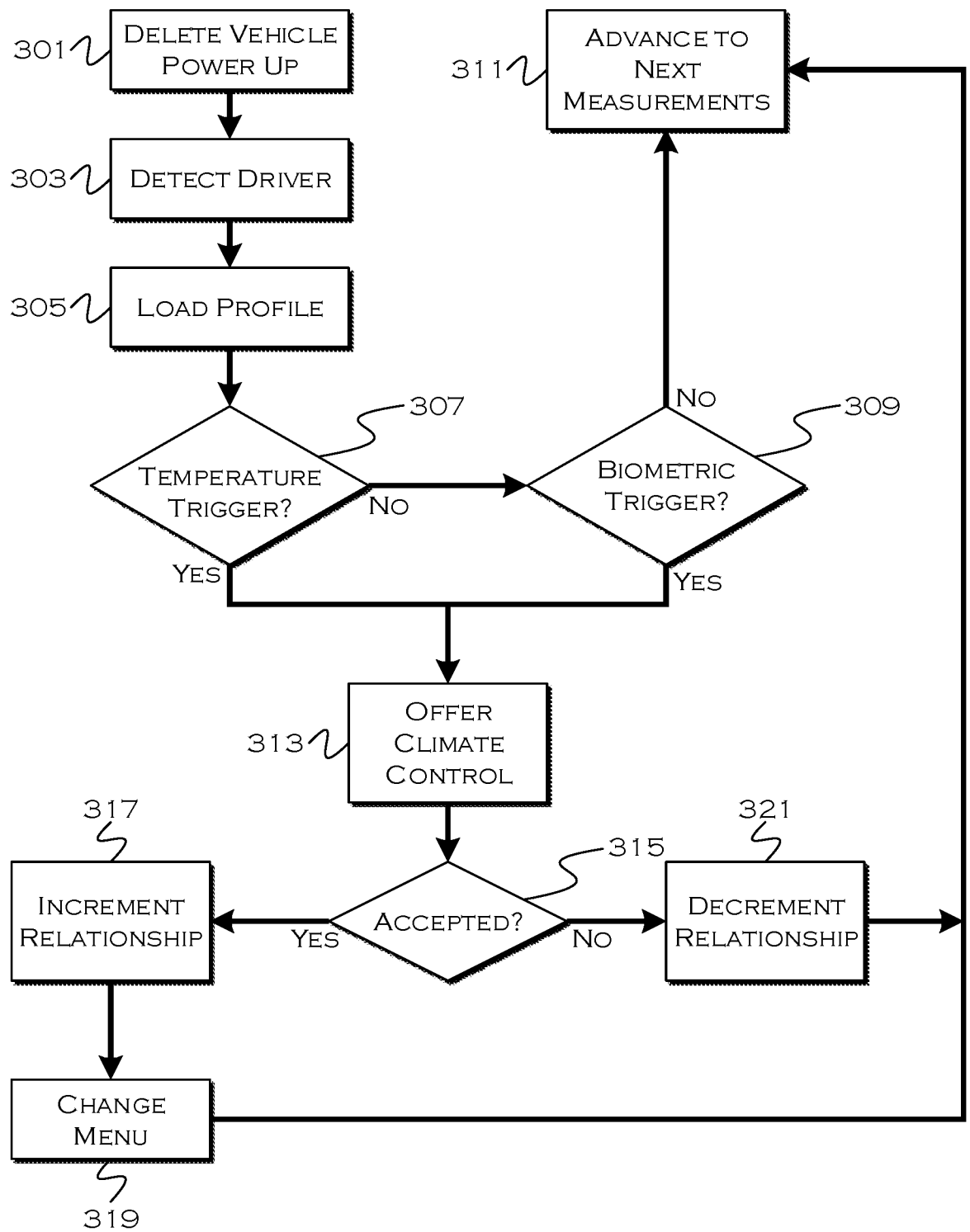
FIG. 3 shows an illustrative example of a first predictive process.
Figure 4:
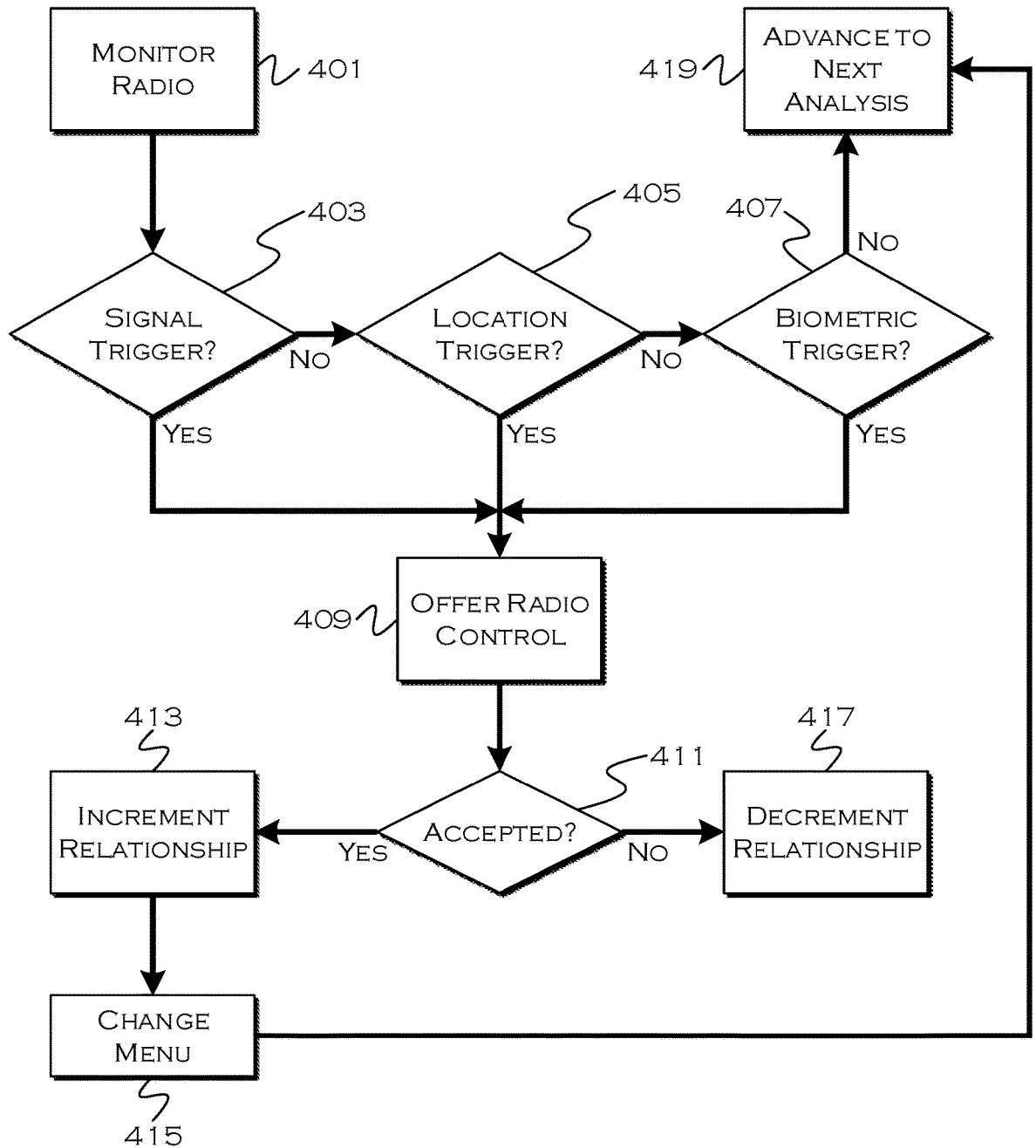
FIG. 4 shows an illustrative example of a second predictive process.

The examples shown with respect to FIGS. 3 and 4 are rule-based examples, mostly because describing, algorithmically, the function of a neural network in such a sense is difficult, as the variables on which the result relies may be shifting or unknown. Those examples are shown as generalizations of how a more complicated prediction algorithm could function to provide varied displays under varied conditions, and are not intended to limit the scope of the invention in any manner, including to rule-based predictions. It is worth noting that a finely tuned predictive outcome may approximate a rule based methodology, once reasonably appropriate weight has been given to the most controlling variables for that prediction, but a neural network can also adapt to the introduction of new variables and tune those variables as appropriate. Further, additional variables to those shown in the figures can be used, and even the relatively simplistic predictions shown can initially be based on an unknown set of variables, which are learned as relevant variables relating to certain behaviors over time, as a more rule-based approximation is tuned.

A prediction algorithm processes received inputs 203 to determine any known or predictable correlations 205. A preset list of expected correlations may be loaded into the prediction algorithm to start, which can be replaced with more driver specific learned behavior as the system observes more and more instances of driver behavior under received inputs. For example, without limitation, a spike in heart rate and driver glances in a rear-view mirror above a certain frequency may initially be used to predict an upcoming lane change. With time, it may be observed that the driver shifts his hand position on a wheel to a certain position for a lane change, and that this is a better indicator than the pre-loaded variables (for a given driver, and again, this is a hypothetical example, not a rule). Thus, the neural network can learn to assign a greater weight to the change in hand position variable, and that variable, combined with some combination of the other exemplary (or different) variables, could become a good predictor of a lane change intent for a given driver.

Because people, not robots, drive vehicles, different variable values can mean different things for different drivers. Accordingly, for any given set of rules and predictions, it may be useful to correlate those rules to a given driver. The rules and observations for drivers can also be uploaded to a central server, where it may be possible to make generalized observations about common variables corresponding to common actions, which could be useful in initially tuning a system for a new driver.

If the process observes any correlations between the received input and known actions, and if those correlations are reasonably equitable to one or more possible driver intents, the system can present an option with the highest likelihood of predicted occurrence 211. Again, this could be presented to the driver for confirmation, before changing a vehicle display or control presentation. If the driver confirms the predicted action is about to occur 213, the process in this example does at least two additional things. In some instances, the process may automatically accept the confirmation (and/or automatically process a change, without actually displaying the confirmation) depending on the anticipated likelihood of an action or if driver preconfigured settings indicate that a particular action should be automatically performed.

First (or second, order is not really important), the process can record that the combination of variables, weighted in the manner considered, corresponded to a particular action. This allows the system to increment the occurrence of the predicted action with respect to the variable set and weights (which may have been tuned as part of the ongoing process) 219. As the same actions are repeatedly observed for the same variables, the process can better predict the actions in the future. The process can also execute a display or control change 221 that will provide the driver with an enhanced in-vehicle experience, by presenting controls or information relating to the upcoming action.

If the prediction is incorrect, the process can decrement the relationship between the predicted action and the observed variables 215. This can include, for example, decreasing weights assigned to certain variables for the purpose of predicting the particularly presented action. The prediction can then be removed from the temporary list of possible predicted actions 217, and, if prediction correlations still remain 205, the process can repeat.

For example, assume that the input variables were those of driver glances in mirrors and hand position. In this example, heart rate is not present as an input. The system may first predict that a turn is being made, which is, for purpose of this example, declined by the driver as the intended action. Next, the system predicts that a lane change will occur. The driver confirms this action. When the turn action is declined, the system may decrease the correlation between glances, hand position and turning by a predetermined decrement. This represents that, in this illustrative instance, those two variables alone did not equate to a turn intent. At the same time, the system may increase the relationship between glances, hand position and lane changing, indicating that those two variables, at least in this example, are sufficient to predict an intent to change lanes.

If this scenario happens with enough frequency, the prediction of lane change (the "correct" prediction here) would surpass the "turn" prediction on the ordered list of likely actions and would become the first presented action. At the same time, the relationship between glances and hand position would have been increased to some extent, with respect to lane changing, so that even if additional variables were present as system inputs representing context, a high correlation between hand position, glancing and lane changing might supersede the existence of one or more unrelated variables and still present a lane change as the first option.

If there is no correlation predictable with a threshold degree of accuracy 205, or if the predicted actions are all declined as the correct actions by the driver, the process can wait to see what action, in fact, the driver does take, if any 207. Once the driver takes an action (that is, an action that would be considered a repeatable, predictable action), the process can log the set of recognized and received inputs with respect to that action 209. Then, the next time the same inputs occur, it may be the case that the system correctly predicts the now-associated action.

Again, this is a fairly simplistic version of how neural networks can act to "learn" driver behavior, but it demonstrates how a vehicle can respond to correctly predicted behavior to assist a driver and to improve the driving experience.

FIG. 3 shows an illustrative example of a first predictive process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

As previously noted, this rule-based example is intended to represent how a vehicle can react to predicted driver intent, and not to limit the invention to rule-based prediction. A rule-based prediction such as this could have been developed dynamically over time from repeated observation of driver behavior, and determining which variables (temperature triggers and biometric triggers, in this example) were relevant to making the eventual determination that climate control was desired.

In this example, the process first detects a vehicle power-up 301. Also, in this example, predictions of behavior are tied to a given, known driver, so a driver is detected upon power up 303. Any reasonable means of driver detection can be used, including detecting a device associated with a driver, recognizing a driver through a fob, behavior or facial recognition, or any other suitable driver recognition. If a driver is not recognized, it is possible to assign a generic profile to the driver, in an attempt to predictively assist the driver, while a profile is built, or simply forego prediction until a reasonable set of predictions for a driver is built/learned.

If the driver is known, the driver profile for that driver is loaded 305. While a driver profile can contain a wealth of information, in this example, the profile includes at least the predictive variables associated with a set of driver predictable behavior. In this example, there is a possible prediction that has been learned, wherein certain temperatures 307 and/or certain driver biometrics 309 indicate an intent to utilize climate control.

For example, if the temperature is below 65 degrees Fahrenheit, or above 80 degrees Fahrenheit, the process could determine that the driver typically institutes a raise or lowering of cabin temperature, respectively. Or, for example, a shiver detected in the user, an exterior body temperature above or below a threshold, or other factor could be used to determine that a change in cabin temperature is commonly instituted. If any of the learned triggers is present at a value indicating a reasonable threshold of predictable climate control usage, the process can offer climate control to the user 313.

If the offer is accepted 315, the process can increment the relationship between the present trigger(s) 317 (resulting in improved predictability, since the prediction was correct), and change a displayed vehicle menu 319 to correspond to climate control. If the offer is declined, the system can decrement the relationship 321. Since the incorrect prediction could simply be a one-off occurrence, a small decrement should not result in termination of the prediction in the future. At the same time, enough incorrect predictions can amount to the prediction falling below a threshold reliability, terminating the prediction (at least based on these variables) until behavior is again observed corresponding to context for which a threshold prediction can be made. Once any climate control has been offered, if needed, the predictive algorithm can continue to observe other inputs for offering other driver assistance 311.

FIG. 4 shows an illustrative example of a second predictive process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, it may be the case for a given driver that certain changes in location, radio signal strength, or driver biometrics can indicate a desire to change a radio station. While the process is described with respect to monitoring the radio, it is understood that what is occurring is an ongoing feed of input into a predictive mechanism, and that this algorithm represents a possible predictive outcome when certain inputs 403, 405 and/or 407 are present.

One of the inputs fed into the algorithm, in this example, is a radio state input 401. Through learned behavior, it has been observed (for purposes of this example) that when a radio signal falls below a threshold strength 403, or when the driver reaches certain geographic coordinates or boundaries 405, or when a biometric trigger (perhaps interpretable as driver dissatisfaction) is present 407, the driver may desire to control the radio to change stations. If any or some of these triggers are present at suitable levels to correspond to a threshold radio-control prediction, the process can offer control over the radio 409.

If the driver accepts the offer 409, again (as with FIG. 3), the relationship between the present inputs and the concept of radio control can be incremented 413. Again, this helps improve future predictions by learning which predictions were or were not correct. A vehicle display can be changed to present a radio control 415. If the driver declines the radio control, the relationship between the radio control prediction and the measured variables can be decremented 417. And, again, the system can continue to process inputs for other driver assistance 419.

A great deal of context can be observed in and around a vehicle. By using a neural network algorithm, new variables (due to, for example, new vehicle sensors) can be incorporated into currently existing predictions and understandings dynamically, through observation over time. While it may take some level of measured observation to formulate predictions, eventually correlations between groups of observed variables and driver actions can be predicted with reasonable accuracy, resulting in improved presentation of vehicle features and driver controls. It is also possible to use these predictions to present controls and features never used by a driver, but which may be useful in a given situation. An automotive OEM knows which features were designed for which situations, so if a given situation is predicted, the features corresponding to that situation can be easily placed at a driver's fingertips.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
predict driver behavior based on a correlation between received context variable values and previously observed driver behavior;
request confirmation that predicted behavior is intended by a driver;

responsive to confirmation receipt, change an in-vehicle display to include a control usable to enact the predicted behavior.

2. The system of claim 1, wherein the previously observed driver behavior and corresponding context variables were stored with respect to a specific driver profile.

3. The system of claim 2, wherein the processor is configured to determine a driver identity and load the specific driver profile corresponding to the identity upon vehicle startup.

4. The system of claim 1, wherein the context variables include driver physiological measurements measured by one or more vehicle-connected sensors.

5. The system of claim 1, wherein the context variables include driver behavior recordations made by one or more vehicle-connected sensors.

6. The system of claim 1, wherein the context variables include environmental variables.

7. The system of claim 1, wherein the context variables include temporal variables.

8. The system of claim 1, wherein the context variables include traffic-related variables.

9. The system of claim 1, wherein the processor is configured to automatically confirm the confirmation request when a predicted likelihood associated with the upcoming driver behavior is above a predetermined threshold and automatically change the in-vehicle display.

10. The system of claim 1, wherein the processor is configured to automatically confirm the confirmation request when a predefined setting indicates that an automatic change should be made for a given upcoming driver behavior and automatically change the in-vehicle display.

11. The system of claim 1, wherein the processor is configured to positively change a stored relationship between one or more of the received context variables and the predicted upcoming driver behavior in response to confirmation receipt.

12. The system of claim 1, wherein the processor is configured to negatively change a stored relationship between one or more of the received context variables and the predicted upcoming driver behavior if the driver declines the confirmation request that the predicted behavior is intended by the driver.

13. A computer-implemented method comprising:
receiving a plurality of context variables and corresponding variable values;
predicting driver behavior based on the received context variable values compared to context variable values received and stored with respect to observed driver behavior; and
automatically changing a vehicle display to display a control usable to enact the predicted behavior.

14. The method of claim 13, wherein the automatically changing further includes automatically changing the display responsive to a likelihood of occurrence, associated with the predicted driver behavior, being above a predetermined threshold.

15. The method of claim 13, wherein the automatically changing further includes automatically changing the display when a predefined driver setting indicates that automatic display change is desired for the predicted driver behavior.

16. The method of claim 13, further comprising:
presenting the predicted driver behavior to a driver for confirmation; and
delaying the automatic change to the vehicle display until confirmation is received.

17. A non-transitory computer readable storage medium, storing instructions that, when executed, cause a processor to execute a method comprising:
receiving a plurality of context variables;
predicting driver behavior based on the received context variable values compared to context variable values received and stored with respect to observed driver behavior; and
automatically changing a vehicle display to display a control usable to enact the predicted behavior.

18. The storage medium of claim 17, wherein the automatically changing further includes automatically changing the display when a likelihood of occurrence, associated with the predicted driver behavior, is above a predetermined threshold.

19. The storage medium of claim 17, wherein the automatically changing further includes automatically changing the display when a predefined driver setting indicates that automatic display change is desired for the predicted driver behavior.

20. The storage medium of claim 17, the method further comprising:
presenting the predicted upcoming driver behavior to a driver for confirmation; and
delaying automatic change to the vehicle display until confirmation is received.

* * * * *